(12) United States Patent
Guddekoppa

(10) Patent No.: US 10,048,886 B2
(45) Date of Patent: Aug. 14, 2018

(54) METHOD AND SYSTEM PROVIDING FILE SYSTEM FOR AN ELECTRONIC DEVICE COMPRISING A COMPOSITE MEMORY DEVICE

(71) Applicant: SAMSUNG ELECTRONICS CO., LTD., Suwon-si, Gyeonggi-do (KR)

(72) Inventor: Vishak Guddekoppa, Bangalore (IN)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/390,021

(22) Filed: Dec. 23, 2016

(65) Prior Publication Data

US 2017/0228190 A1    Aug. 10, 2017

(30) Foreign Application Priority Data

Feb. 5, 2016    (IN) .............................. 201641004286

(51) Int. Cl.
*G06F 12/00*    (2006.01)
*G06F 3/06*    (2006.01)

(52) U.S. Cl.
CPC .......... *G06F 3/0643* (2013.01); *G06F 3/0611* (2013.01); *G06F 3/0644* (2013.01); *G06F 3/0688* (2013.01)

(58) Field of Classification Search
CPC .... G06F 3/0643; G06F 3/0644; G06F 3/0611; G06F 3/0688
See application file for complete search history.

(56) References Cited

U.S. PATENT DOCUMENTS

| 9,348,705 | B1 * | 5/2016 | Wu ..................... G06F 11/1469 |
| 2016/0011802 | A1 * | 1/2016 | Berke .................. G06F 3/0619 711/166 |
| 2017/0160980 | A1 * | 6/2017 | Golander ............. G06F 3/0643 |

OTHER PUBLICATIONS

NVDIMM-N Cookbook. SNIA Global Education. Jeff Chang, Arthur Sainio. pp. 1-39. 2015.*

* cited by examiner

*Primary Examiner* — David X Yi
*Assistant Examiner* — Tahilba Puche
(74) *Attorney, Agent, or Firm* — F. Chau & Associates, LLC

(57) ABSTRACT

A method of providing a file system for an electronic device includes organizing a plurality of Non-Volatile Dual In-Line Memory Module-Ps (NVDIMM-Ps) of a memory device of the electronic device into a plurality of groups based on location information of the NVDIMM-Ps, and creating a single File System Instance (FSI) for each group included in the plurality of groups.

19 Claims, 6 Drawing Sheets

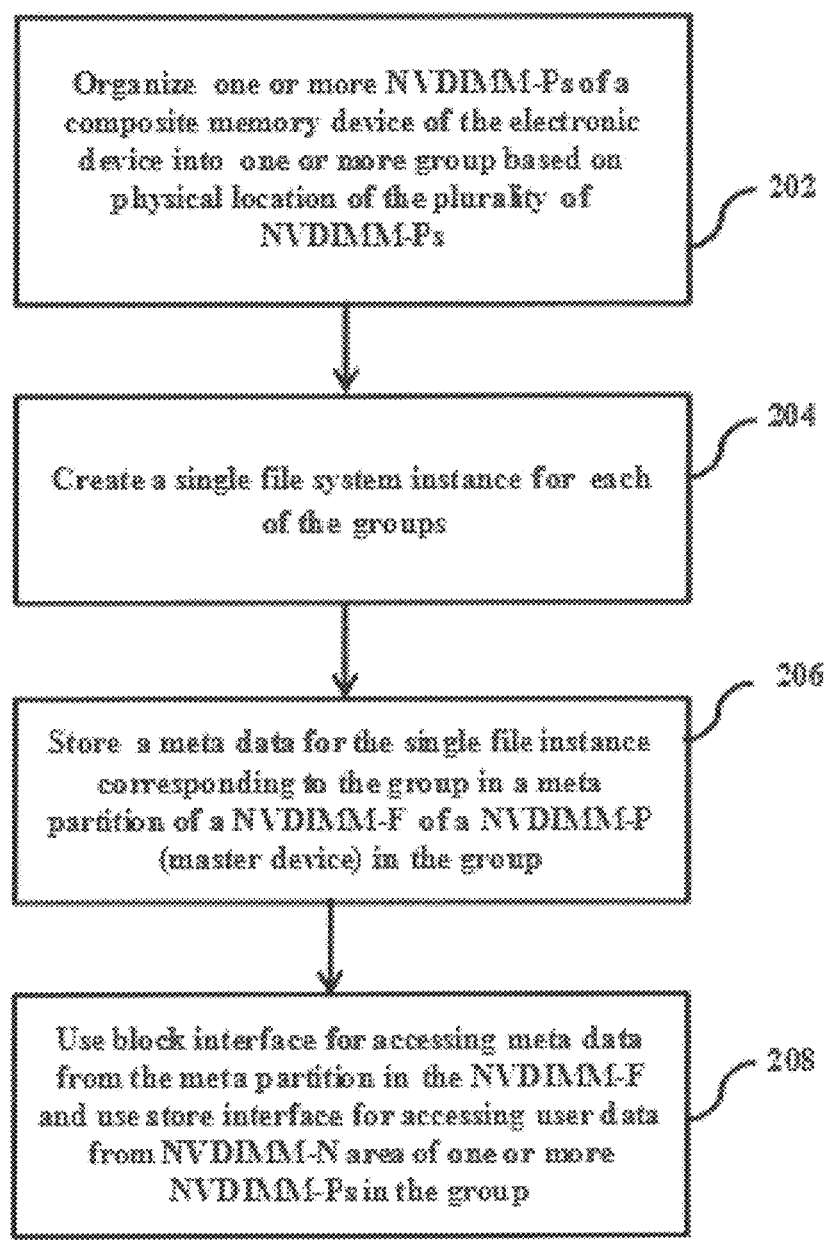

METHOD AND SYSTEM PROVIDING FILE SYSTEM FOR AN ELECTRONIC DEVICE COMPRISING A COMPOSITE MEMORY DEVICE

CROSS-REFERENCE TO RELATED APPLICATIONS

This application claims priority under 35 U.S.C. § 119 to Indian Patent Application No. 201641004286 filed on Feb. 5, 2016, the disclosure of which is incorporated by reference herein in its entirety.

TECHNICAL FIELD

Exemplary embodiments of the inventive concept generally relate to electronic devices including a composite memory device, and more particularly, to a file system for electronic devices including the composite memory device.

DISCUSSION OF THE RELATED ART

Computing and storage systems such as servers play an important role in the current electronic world of cloud computing, virtualization, high-performance computing (HPC), databases, big data, real-time video editing of 4K content, etc. A primary memory of a computing and storage device such as a server is used to boot and run normally so that server hypervisors, operating systems (OS), applications, etc. do not run out of random access memory (RAM). Conventionally, a Dynamic Random Access Memory (DRAM) is used as a primary memory.

Emerging next generation memory devices or storage devices such as Non-Volatile Dual in-line Memory Modules (NVDIMMs) are being widely used for data storage and primary memory functions. The NVDIMMs are connected to a processor through a memory controller instead of a conventional Peripheral Component Interconnect (PCI) bus. The NVDIMMs perform workloads at DRAM speeds, yet are persistent and provide data retention in the event of a power failure or system crash. Further, the data can be available almost immediately upon power being restored to a host system. Thus, the NVDIMMs provide high speed with low latency for Input/Output (I/O) operations.

SUMMARY

According to an exemplary embodiment of the inventive concept, a method of providing a file system for an electronic device includes organizing a plurality of Non-Volatile Dual In-Line Memory Module-Ps (NVDIMM-Ps) of a memory device of the electronic device into a plurality of groups based on location information of the NVDIMM-Ps, and creating a single File System Instance (FSI) for each group included in the plurality of groups.

According to an exemplary embodiment of the inventive concept, an electronic device includes a memory device including a plurality of Non-Volatile Dual In-Line Memory Modules-P (NVDIMM-Ps) and a processor. The processor is configured to organize the plurality of NVDIMM-Ps into a plurality of groups based on location information of the NVDIMM-Ps, and create a single File System Instance (FSI) for each group included in the plurality of groups.

According to an exemplary embodiment of the inventive concept, a computer program product for providing a file system for an electronic device including a memory device is provided. The computer program product includes a non-transitory computer-readable storage medium having program instructions embodied therewith. The program instructions are executable by a processor to cause the processor to organize a plurality of Non-Volatile Dual In-Line Memory Module-Ps (NVDIMM-Ps) of the memory device into a plurality of groups based on location information of the NVDIMM-Ps, and create a single File System Instance (FSI) for each group included in the plurality of groups.

BRIEF DESCRIPTION OF THE DRAWINGS

The above and other features of the present inventive concept will become more apparent by describing in detail exemplary embodiments thereof with reference to the accompanying drawings, in which:

FIG. 2 is a flow diagram illustrating a method of providing a file system for an electronic device including a composite memory device, according to an exemplary embodiment of the inventive concept.

DETAILED DESCRIPTION OF THE EMBODIMENTS

Figure 1:
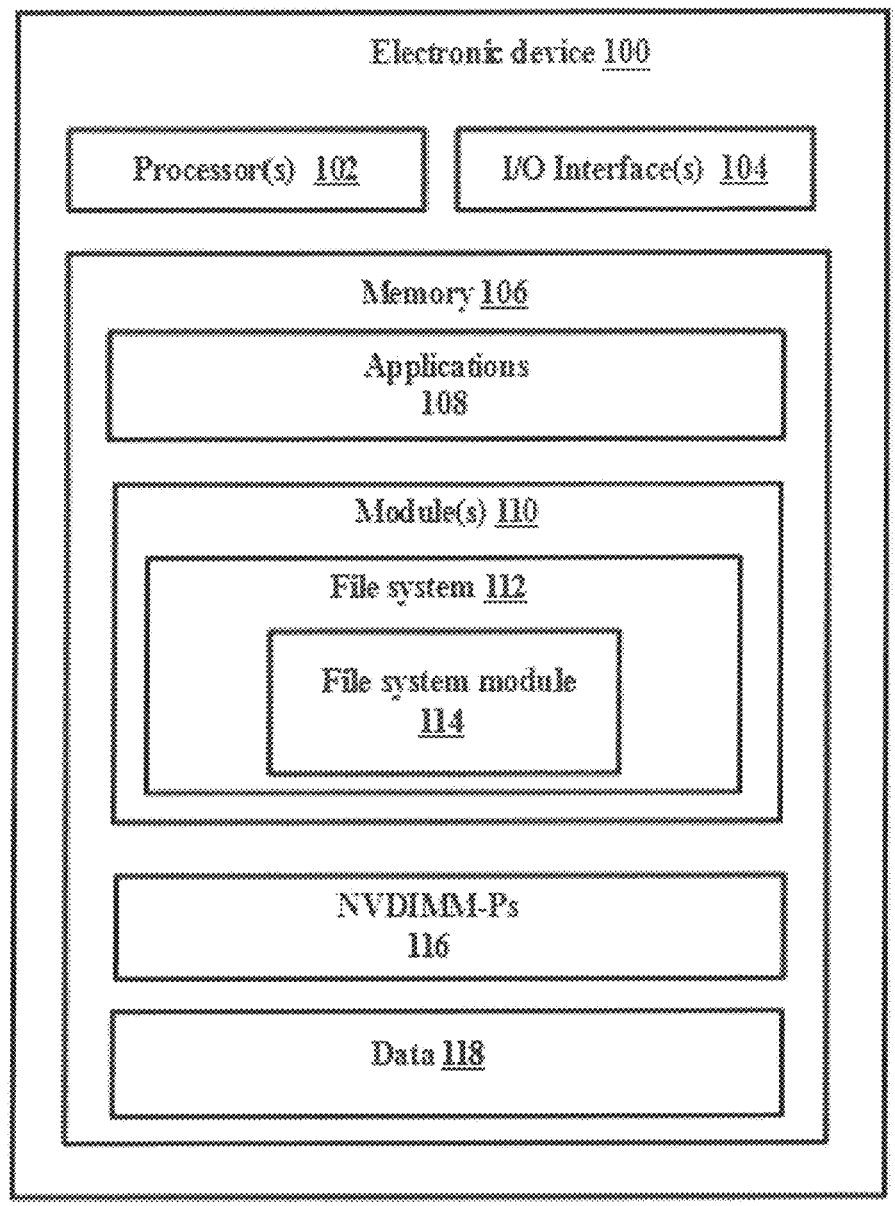
FIG. 1 illustrates a plurality of components of an electronic device that provides a file system for a composite memory device in the electronic device, according to an exemplary embodiment of the inventive concept.

Exemplary embodiments of the present inventive concept will be described more fully hereinafter with reference to the accompanying drawings. Like reference numerals may refer to like elements throughout the accompanying drawings.

As used herein, the singular forms "a", "an" and "the" are intended to include the plural forms as well, unless the context clearly indicates otherwise.

A Non-Volatile Dual In-Line Memory Module-F (NVDIMM-F) is a block device (e.g., a block addressable device) that is frequently used as a secondary storage device (e.g., a hard disk). A Non-Volatile Dual In-Line Memory Module-N(NVDIMM-N) is a character device (e.g., a byte addressable device), and is typically used as a power backed Dynamic Random Access Memory (DRAM) in a primary memory. A Non-Volatile Dual In-Line Memory Module-P (NVDIMM-P) combines the NVDIMM-F and the NVDIMM-N into a single device.

Storage devices or memory devices utilize a file system to efficiently read or write data to the memory devices. The file system is a structured data representation and a set of meta data that describes the stored data. Existing NVDIMM-N aware file systems in a kernel space store meta data of the file system and user data in a NVDIMM-N area of a NVDIMM-N. Thus, an existing NVDIMM-N aware file system introduces a limitation on storage space for user data, and the NVDIMM-N area is shared for the meta data of the file system and the user data. In addition to this limitation, since the size of the NVDIMM-N is typically small (e.g., about 1 GB to about 2 GB), the available storage space for user data is limited. Further, the cost per byte in the NVDIMM-N is typically high compared to that of the NVDIMM-F, which typically has a larger size (e.g., about 1 TB to about 2 TB), since the NVDIMM-N is to be backed up on sudden power off. Thus, even though the cost per byte is high, the NVDIMM-N area in an existing NVDIMM-N aware file system is not entirely available for user data storage. Thus, the cost per byte is further increased. This constraint on the user data space availability in the existing NVDIMM-N affects a NVDIMM-P storage device that combines NVDIMM-F and NVDIMM-N into single device. Further, each NVDIMM-P used, for example, by a server, may utilized a separate file system (also referred to as a file system instance (FSI)) dedicated to that NVDIMM-P. However, server platforms may include multiple NVDIMM-Ps. Thus, having a separate FSI for each NVDIMM-P device results in the use of additional space for storage of the multiple file instances. Further, existing NVDIMM-N aware file systems may be unable to assist features of the memory controller that enable accessing memory devices in an interleaved manner. Thus, existing file systems may be unable to efficiently use the memory device's storage space, resulting in an increase in the cost per byte for memory devices. Further, existing file systems may be unable to allow access to memory devices in an interleaved manner, thus, increasing device access latency.

Exemplary embodiments of the present inventive concept provide a method and a system for providing a file system for an electronic device including a composite memory device. The composite memory device includes, for example, one or more Non-Volatile Dual In-Line Memory Modules-P (NVDIMM-Ps). Each NVDIMM-P includes a combination of a NVDIMM-N and a NVDIMM-F.

In an exemplary embodiment, a composite memory device in an electronic device includes a plurality of NVDIMM-Ps. The exemplary embodiment may utilize a NVDIMM-N aware file system for the plurality of NVDIMM-Ns within the plurality NVDIMM-Ps using a single file system instance (FSI), rather than creating a separate file system for each NVDIMM-N. A method according to an exemplary embodiment includes organizing NVDIMM-Ps of the composite memory device into one or more groups based on location information of one or more NVDIMM-Ps. That is, the method includes separating/dividing the NVDIMM-Ps of the composite memory device into one or more groups. Thus, the NVDIMM-Ps, which may be located on different channels, can be grouped in a single group. The method provides a file system that can create a single file system instance (FSI) for each group from among one or more groups of the NVDIMM-Ps. The single FSI serves all NVDIMM-Ns in the same group (e.g., the single FSI serves all NVDIMM-Ns included in the NVDIMM-Ps that are in the same group). According to exemplary embodiments, different groups do not share the same FSI. Rather, each group has its own dedicated FSI.

Further, the method includes storing meta data for each single FSI in a meta partition of one NVDIMM-F from among the plurality of the NVDIMM-Fs belonging to the same group. The NVDIMM-P that is associated with (e.g., that includes) the NVDIMM-F that is used to store the meta data in its meta partition may be referred to as a master device. Thus, the single FSI technique provided by exemplary embodiments of the inventive concept eliminates the need for maintaining multiple file instances for each NVDIMM-N within a group of NVDIMM-Ps in the composite memory device. As a result, the storage space included in a composite memory device including one or more NVDIMM-Ps according to exemplary embodiments may be more efficiently managed (e.g., a storage space requirement of the composite memory device including one or more NVDIMM-Ps may be reduced). Further, the method includes accessing the meta partition of the NVDIMM-F for handling the meta data using a block interface. The block interface is an asynchronous interface providing block level access of the meta partition. Since the meta data for every NVDIMM-N is stored outside the NVDIMM-N and on the master device of the group (e.g., on the master device's NVDIMM-F), the entire NVDIMM-N area of each of the NVDIMM-N of the group is available for user data (e.g., since the meta data for each NVDIMM-N is not stored thereon). That is, in exemplary embodiments, the meta data is stored only in the meta partition of the group's master device and is not stored on any of the NVDIMM-Ns in the group. Thus, exemplary embodiments increase NVDIMM-N storage space, thus, effectively reducing the cost per byte of the NVDIMM-N. The user data in the NVDIMM-N area corresponding to each of the NVDIMM-N of the group can be accessed using a store interface. The store interface is a synchronous interface providing byte level access of the NVDIMM-N area. Thus, the file system provided by the method according to exemplary embodiments allows parallel access of user data from NVDIMM-Ns in a group, reducing device access latency. The method according to exemplary embodiments provides a file system that is aware of and compatible with the device interfaces being used in the electronic device, such as the block interface and the store interface, and efficiently utilizes the file system for the user data access from the NVDIMM-N area and the meta data access from the meta partition on the NVDIMM-F.

In an exemplary embodiment, the electronic device is a computing and/or storage device that includes a composite memory such as, for example, a NVDIMM-P. The device may be, for example, a file server, financial and real time transaction servers, enterprise servers, etc.

FIG. 1 illustrates a plurality of components of an electronic device that provides a file system for a composite memory device in the electronic device 100, according to an exemplary embodiment of the present invention.

Referring to FIG. 1, an electronic device 100 is illustrated in accordance with an exemplary embodiment of the inventive concept. In an exemplary embodiment, the electronic device 100 may include at least one processor 102, an input/output (I/O) interface 104 (also referred to as a configurable user interface), and a memory 106. The at least one processor 102 may be implemented as, for example, one or more microprocessors, microcomputers, microcontrollers, digital signal processors, central processing units, state machines, logic circuitries, and/or any devices that manipulate signals based on operational instructions. Among other capabilities, the at least one processor 102 is configured to fetch and execute computer-readable instructions stored in the memory 106. The I/O interface 104 may include a variety of software and hardware interfaces such as, for example, a web interface, a graphical user interface, etc. The I/O interface 104 may allow the electronic device 100 to communicate with other devices. The I/O interface 104 may facilitate multiple communications within a wide variety of networks and protocol types, including wired networks such as, for example, Local Area Network (LAN), cable, etc., and wireless networks such as, for example, Wide Area Network (LAN), cellular, Device to Device (D2D) communication network, Wi-Fi networks, etc.

In an exemplary embodiment, the memory 106 may store applications 108, modules 110, a composite memory device including one or more NVDIMM-Ps 116, and data 118. The one or more NVDIMM-Ps included in the electronic device 100 are NVDIMM-Ps according to exemplary embodiments of the inventive concept described herein. A system memory controller interface, which functions as an interface between the at least one processor 102 and the memory 106, may include multiple channels, and each channel may include multiple slots for memory devices such as NVDIMM-Ps 116. Thus, in exemplary embodiments, the NVDIMM-Ps 116 are spread across channels of the memory controller interface.

The modules 110 include, for example, routines, programs, objects, components, data structures, etc., which perform particular tasks and functions, or implement particular data types. In an exemplary embodiment, the modules 110 may include a file system 112 that includes a file system module 114. The file system 112 and the file system module 114 may be collectively referred to as a file system 112 that is stored on the memory 106. The file system 112 may be configured to organize NVDIMM-Ps of the composite memory device into one or more groups based on location information of one or more NVDIMM-Ps 116. Thus, the NVDIMM-Ps 116, which are located on different channels in exemplary embodiments, may be grouped in a single group. In an exemplary embodiment, the file system 112 is the NVDIMM-N aware file system for the plurality of NVDIMM-Ns within the plurality NVDIMM-Ps 116, and as described above, the file system 112 uses a single file instance (FSI) for one or more NVDIMM-Ns within a single group of NVDIMM-P. Thus, the single FSI serves all NVDIMM-Ns in the same group (e.g., the single FSI serves all NVDIMM-Ns included in the same group of NVDIMM-Ps). Further, the file system module 114 may store meta data (e.g., within the memory 106 storing the file system 112) for the single FSI in the meta partition of one NVDIMM-F from among the plurality of the NVDIMM-Fs belonging to the same group. As described above, the NVDIMM-P associated with the NVDIMM-F that stores the meta data in its meta partition may be referred as the master device. A format utility of the file system 112 can be configured to group the NVDIMM-N portion of available and suitable NVDIMM-P devices and write the meta data in the meta partition. Thus, utilization of a single FSI according to the exemplary embodiments described herein eliminates the need for maintaining multiple file instances for each NVDIMM-N in the composite memory device. Further, the file system module 114 may access the meta partition of the NVDIMM-F for handling the meta data using the block interface. The block interface is an asynchronous interface providing block level access of the meta partition. Since the meta data for every NVDIMM-N is stored outside the NVDIMM-N and on the master device of the group (e.g., on the NVDIMM-F of the master device), the entire NVDIMM-N area of each of the NVDIMM-N of the group is available for user data (e.g., since the meta data for each NVDIMM-N is not stored thereon). Thus, exemplary embodiments increase NVDIMM-N storage space, and thus, effectively decrease the cost per byte of the NVDIMM-N. The user data in the NVDIMM-N area corresponding to each of the NVDIMM-N of the group can be accessed using the store interface. Thus, the file system 112 provided by the method according to exemplary embodiments allows parallel access of user data from NVDIMM-Ns in the single group, reducing device access latency. The parallel access to the areas of the user data is possible due to the location of the NVDIMM-Ps, which may be chosen at format time based on parallel access capability. Since the NVDIMM-Ps placed in groups are from different channels, the NVDIMM-Ps may be accessed in parallel. The file system 112 is further explained with reference to an example described in conjunction with FIGS. 3A, 3B and 4.

The modules 110 may include programs or coded instructions that supplement applications 108 and functions of the electronic device 100. The data 118 serves as a repository for storing data processed, received, and generated by one or more of the modules 110.

FIG. 2 is a flow diagram illustrating a method of providing a file system for the electronic device 100 including the composite memory device, according to an exemplary embodiment of the inventive concept. The composite memory device includes a plurality NVDIMM-Ps 116, in which each NVDIMM-P includes a combination of the NVDIMM-N and the NVDIMM-F. The system memory controller interface, which is the interface between the at least one processor 102 and the memory 106, may provide multiple channels. Each channel may have multiple slots for memory devices such as the NVDIMM-Ps 116. Thus the NVDIMM-Ps 116 may be spread across channels of the memory controller interface. When the file system module 114 is described herein as performing operations, it is to be understood that the file system 112, which is stored on the memory 106, is performing operations under the control of a processor.

At operation 202, the file system module 114 organizes the NVDIMM-Ps 116, which are spread across channels, into one or more groups. That is, the file system module 114 separates/divides the NVDIMM-Ps into one or more groups. The groups are organized based on location information such as, for example, channel number and device number, as described further with reference to FIG. 4. Thus, NVDIMM-Ps that are located on different channels may be grouped together in a single group.

At operation 204, the file system module 114 creates a single file system instance (FSI) for each of the groups of NVDIMM-Ps created in operation 202, rather than creating a separate file system for each NVDIMM-N in a same group. The single FSI serves all NVDIMM-Ns that are in the same group.

At operation 206, the file system module 114 stores meta data for the FSI in a meta partition included on of one the NVDIMM-Fs from among the plurality of NVDIMM-Fs belonging to the same group. Thus, one NVDIMM-F in each group holds the meta data for the corresponding group (e.g., for the entire group from which the one NVDIMM-F belongs) in a location partitioned as a meta partition. The file system module 114 may partition the NVDIMM-F area using, for example, a normal disk partitioning tool, and may identify and reserve one partition as the meta partition for storing the meta data of all NVDIMM-Ns in the same group. The format utility of the file system 112 groups the NVDIMM-N portion of available and suitable NVDIMM-P devices and writes the meta in the meta partition. Every group identifies one NVDIMM-P which is associated with the NVDIMM-F selected for storing the meta data in the meta partition. As described above, this NVDIMM-P may be referred as the master device of the group. Each group of NVDIMM-Ps includes its own master device. Thus, according to exemplary embodiments, utilization of a single FSI for each of a plurality of groups of NVDIMM-Ps eliminates the need for maintaining multiple file instances for each NVDIMM-N in the composite memory device. As a result, the storage space requirement in the composite memory device with one or more NVDIMM-Ps may be effectively reduced.

At operation 208, the file system module 114 accesses the meta partition of the NVDIMM-F of the master device for handling the meta data using the block interface. The block interface is the asynchronous interface providing block level access to the meta partition. Since the meta data for every NVDIMM-N is stored outside the NVDIMM-N and instead on the master device of the group (e.g., in the NVDIMM-F of the master device), the entire NVDIMM-N area of each the NVDIMM-Ns of the group is available for user data (e.g., none of the NVDIMM-N area is used for meta data). This increases NVDIMM-N storage space for user data, and effectively decreases the cost per byte of each NVDIMM-N. The user data in the NVDIMM-N area corresponding to each of the NVDIMM-N of the group may be accessed using the store interface. The store interface is the synchronous interface providing byte level access to the NVDIMM-N area. Thus, the file system 112 according to exemplary embodiments allows parallel access of user data from NVDIMM-Ns of the same group, which may result in reduced device access latency. Parallel access may be implemented due to the physical location of devices being placed in different channels. Further, the byte interface used to access user data from NVDIMM-Ns is a faster interface compared to the block interface used to access data from NVDIMM-Fs. The file system 112 is aware of and compatible with the device interfaces such as the block interface and the store interface, and appropriately utilizes the interfaces for the user data access from the NVDIMM-N area and the meta data access from the meta partition of the NVDIMM-F.

It is to be understood that the various operations described with reference to FIG. 2 may be performed in the order presented, in a different order, or simultaneously. Further, in exemplary embodiments, certain operations described with reference to FIG. 2 may be omitted.

Figure 3A:
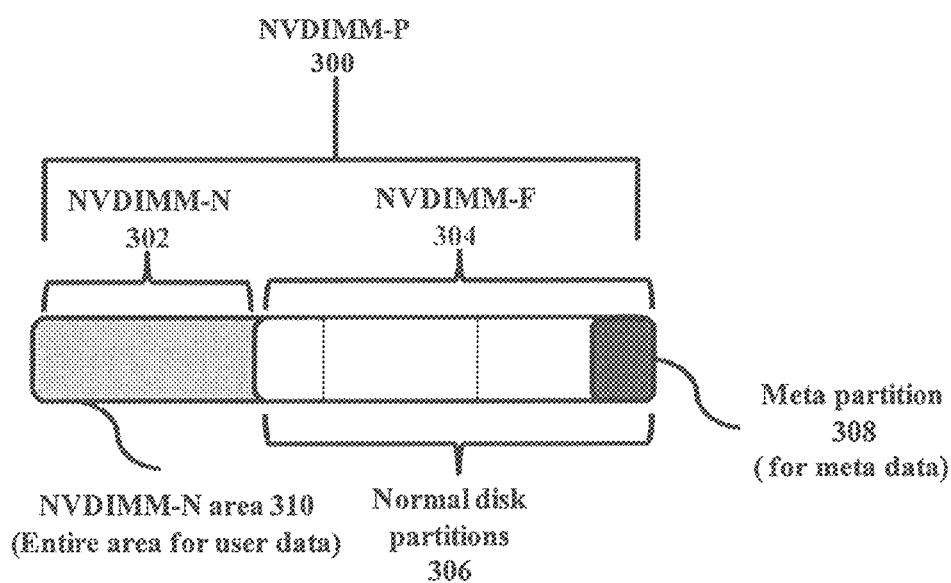
FIG. 3A illustrates a Non-Volatile Dual In-Line Memory Module-P (NVDIMM-P) with storage space distribution for user data and meta data of a Non-Volatile Dual In-Line Memory Module-N(NVDIMM-N) integrated in the NVDIMM-P, according to an exemplary embodiment of the inventive concept.

FIG. 3A illustrates a NVDIMM-P 300 with storage space distribution for user data and meta data of the NVDIMM-N 302 integrated in the NVDIMM-P 300, according to an exemplary embodiment of the inventive concept. In FIG. 3A, the NVDIMM-P 300 is a combination of the NVDIMM-N 302 and a NVDIMM-F 304. The file system 112 that creates the FSI for the NVDIMM-N 302 stores meta data of the NVDIMM-N 302 in NVDIMM-F's meta partition 308. The meta partition 308 is one partition from among multiple normal disk partitions 306 of the NVDIMM-F 304. Thus the entire N-area 310 of the NVDIMM-N 302 is available for the user data to be stored in the NVDIMM-N 302, since meta data is not stored in the entire N-area 310. The normal disk partition may be created during a disk formatting operation.

Figure 3B:
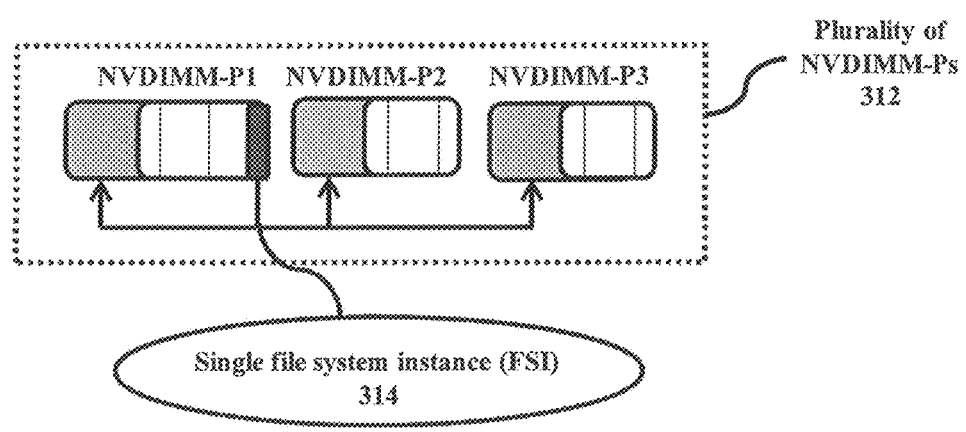
FIG. 3B illustrates the grouping of a plurality of NVDIMM-Ps in a single group with a single file system instance (FSI) for a plurality of NVDIMM-Ns within the group, according to an exemplary embodiment of the inventive concept.

FIG. 3B illustrates the grouping of a plurality of NVDIMM-Ps 312 in a single group with a single file system instance (FSI) for the plurality of NVDIMM-Ns included in the group of NVDIMM-Ps, according to an exemplary embodiment of the inventive concept.

FIG. 3B illustrates NVDIMM-P1, NVDIMM-P2 and NVDIMM-P3, which are included in the composite device environment of memory 106. NVDIMM-P1, NVDIMM-P2 and NVDIMM-P3 are grouped together by the file system 112 as a single group of NVDIMM-Ps 312, as indicated by the dotted line in FIG. 3B. A single FSI 314 is created for all the NVDIMM-P1, the NVDIMM-P2 and the NVDIMM-P3 included in the group 312, and metadata for all corresponding NVDIMM-Ns of the NVDIMM-P1, the NVDIMM-P2 and the NVDIMM-P3 are stored in the meta partition of the NVDIMM-F area of the NVDIMM-P2 (in this exemplary embodiment, the NVDIMM-P2 is the master device). Thus, in exemplary embodiments, the entire NVDIMM-N area of the NVDIMM-P1, the NVDIMM-P2 and the NVDIMM-P3 is available for user data.

Figure 4:
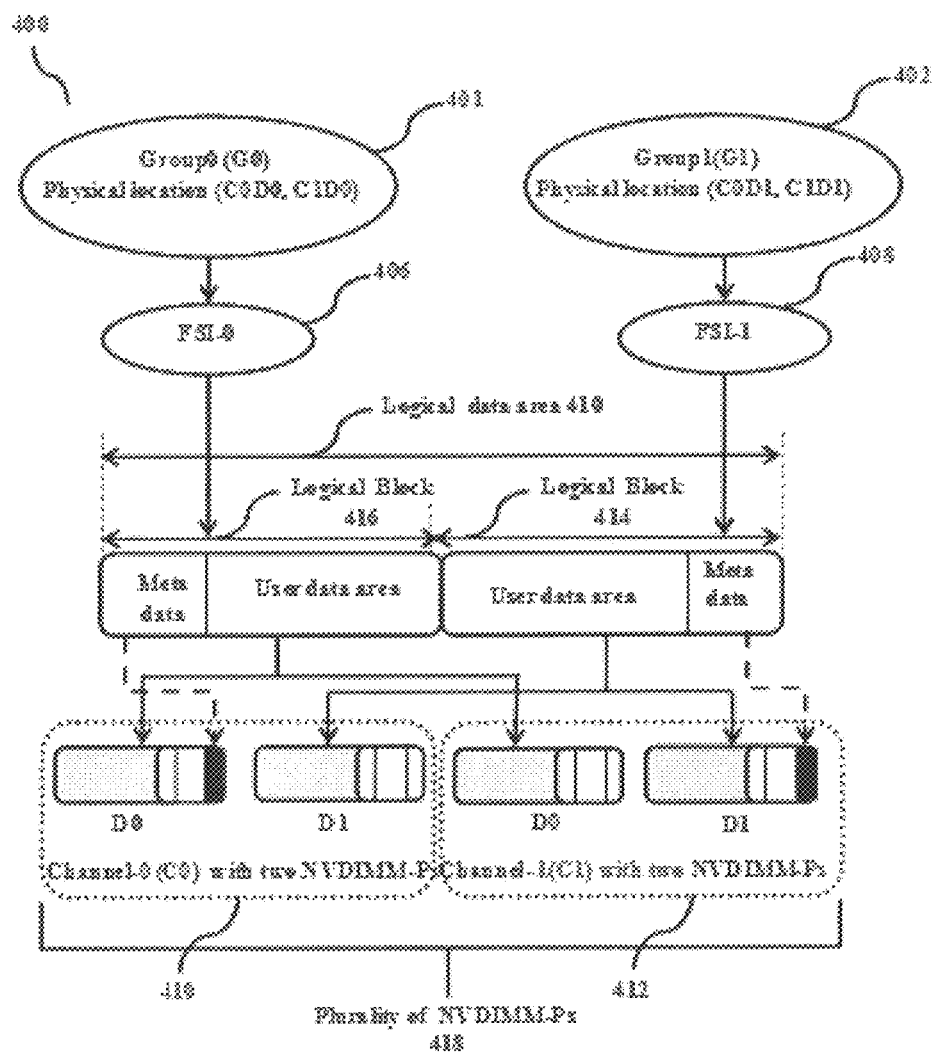
FIG. 4 is an example illustrating the grouping of a plurality of NVDIMM-Ps of a composite memory device into a plurality of groups with NVDIMM-Ps in a group spread across channels of the composite memory device, according to an exemplary embodiment of the inventive concept.

FIG. 4 is an example illustrating the grouping of a plurality of NVDIMM-Ps 418 of a composite memory device 400 into a plurality of groups with NVDIMM-Ps in a group spread across channels of the composite memory device 400, according to an exemplary embodiment of the inventive concept. In FIG. 4, the plurality of NVDIMM-Ps 418, including D0, D1 of channel C0 (410), and D0, D1 of Channel C1 (412), are organized into two groups 401 and 402 (G0 and G1) respectively by the file system 112. The group G0 includes device D0 of channel C0 and device D0 of channel C1 (G0=devices with a physical location indicated by location information such as C0D0, C1D0). Similarly, the group G1 includes device D1 of channel C0 and device D1 of channel C1 (G1=devices with a physical location indicated by location information such as C0D1, C1D1). For each group G0 and G1, an FSI-0 406 and an FSI-1 408 is respectively created. Meta data for the FSI-0 is stored in a meta partition of one of the NVDIMM-Fs of group G0. Similarly, meta data for the FSI-1 is stored in a meta partition of one of the NVDIMM-Fs of group G1. The format utility of the file system 112 groups the NVDIMM-N portion of available and suitable NVDIMM-P devices, and writes the meta data in the meta partition, for example, during device formatting. This information (e.g., the meta data) may be stored in a superblock on the master device's (e.g., the selected NVDIMM-P for the group) chosen partition (e.g., the master device's meta partition). The order of devices in the group dictates how data is striped across devices. In exemplary embodiments, since a user may swap devices between boots, the device location itself is not used to determine the order. Rather, in exemplary embodiments, to obtain the proper order, the file system 112 may be configured to write a sequence number on each device's NVDIMM-N's area at the time of formatting. For example, the first block of each NVDIMM-N device has sequence number. This sequence number may be read by the file system 112 at the time of mounting. In the event of a device swap, the file system 112 may detect the swap and obtain the correct order. This information (e.g., meta data) may also be used in the event that a device is swapped across channels. In this case, the user may be informed.

Thus, with each group G0 and G1 having its own FSI (e.g., the FSI-0 and the FSI-1, as respectively depicted in FIG. 4), a logical data area 410 for the NVDIMM-N area in the composite memory device 400 may be implemented as two logical blocks 414 and 416, respectively. The metadata corresponding to the NVDIMM-N area of all NVDIMM-Ns in the group is stored in one of the NVDIMM-Fs of the group. Thus, the entire NVDIMM-N area within the group is available as a user data area. The file system 112 uses the block interface to access the meta data for the group (G0 and G1). The file system 112 uses the store interface for simultaneous access of the user data of each NVDIMM-N within the group. Since group devices may be accessed in parallel, this may result in reduced device access latency. In FIG. 4, solid lines with arrows indicate that the store interface is being used (e.g., for user data access), and dashed lines with arrows indicate that the block interface is being used (e.g., for meta data access).

According to exemplary embodiments, effective device access latency may be computed by dividing individual device latency by the number of devices in that particular group.

Figure 5:
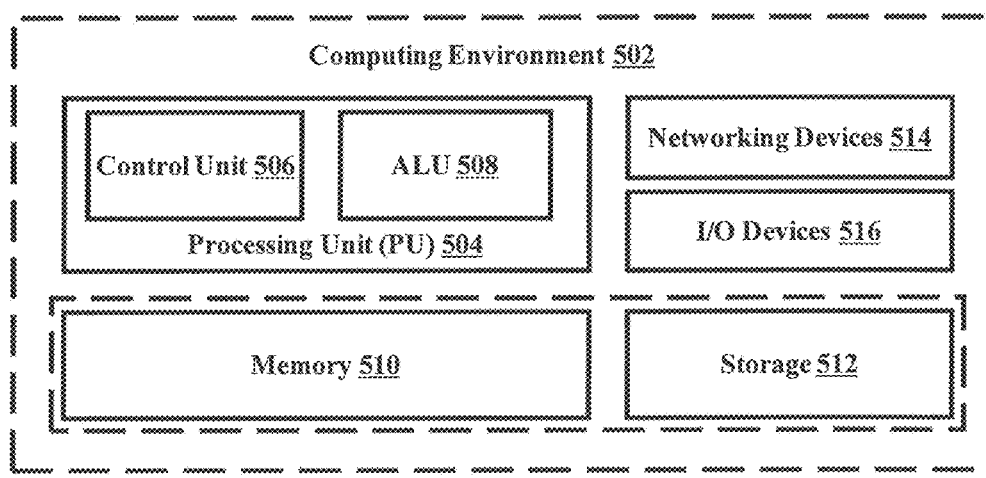
FIG. 5 illustrates an exemplary computing environment for implementing the method of providing the file system for the electronic device that includes the composite memory device, according to an exemplary embodiment of the inventive concept.

FIG. 5 illustrates an exemplary computing environment for implementing the method of providing a file system for an electronic device that includes a composite memory device, as disclosed in the exemplary embodiments herein.

As depicted, the computing environment 502 includes at least one processing unit (e.g., a processor) 504 that is equipped with a control unit 506 and an Arithmetic Logic Unit (ALU) 508, a memory 510, a storage unit 512, plurality of networking devices 514, and a plurality Input/Output (I/O) devices 516. The processing unit 504 processes the instructions to implement the method/algorithm described herein according to exemplary embodiments. The processing unit 504 receives commands from the control unit 506 to perform its processing. Logical and arithmetic operations involved in the execution of the instructions may be computed with the assistance of the ALU 508.

The overall computing environment 502 may be composed of multiple homogeneous and/or heterogeneous cores, multiple CPUs of different kinds, special media and other accelerators. The processing unit 504 processes the instructions of the method/algorithm described herein according to exemplary embodiments. The plurality of processing units 504 may be located on a single chip or on multiple chips.

The method/algorithm including instructions and code for the implementation are stored in the memory unit 510 and/or the storage 512. At the time of execution, the instructions may be fetched from the corresponding memory 510 and/or storage 512, and executed by the processing unit 504. Various networking devices 514 or external I/O devices 516 may be connected to the computing environment to support different implementations through the networking unit and the I/O device unit.

The exemplary embodiments disclosed herein may be implemented through at least one software program running on at least one hardware device and performing network management functions to control the network elements. The network elements shown in FIGS. 1-5 include blocks which can be at least one of a hardware device, or a combination of a hardware device and a software module.

Exemplary embodiments of the inventive concept may be embodied directly in hardware, in a software module executed by a processor, or in a combination of the two. A software module may be tangibly embodied on a non-transitory program storage device such as, for example, in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an application specific integrated circuit (ASIC). Additionally, the ASIC may reside in a user terminal. Alternatively, the processor and the storage medium may reside as discrete components in a user terminal.

It is to be understood that the present inventive concept may be implemented in various forms of hardware, software, firmware, special purpose processors, or a combination thereof. In one embodiment, the present inventive concept may be implemented in software as an application program tangibly embodied on a program storage device. The application program may be uploaded to, and executed by, a machine comprising any suitable architecture.

As is traditional in the field of the inventive concept, exemplary embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the exemplary embodiments may be physically separated into two or more interacting and discrete blocks, units and/or modules without departing from the scope of the inventive concept. Further, the blocks, units and/or modules of the exemplary embodiments may be physically combined into more complex blocks, units and/or modules without departing from the scope of the inventive concept.

While the present inventive concept has been particularly shown and described with reference to the exemplary embodiments thereof, it will be understood by those of ordinary skill in the art that various changes in form and detail may be made therein without departing from the spirit and scope of the present inventive concept as defined by the following claims.

What is claimed is:

1. A method of providing a file system for an electronic device, comprising:
   organizing a plurality of Non-Volatile Dual In-Line Memory Module-Ps (NVDIMM-Ps) of a memory device of the electronic device into a plurality of groups based on location information of the NVDIMM-Ps,
   wherein the plurality of groups comprises a first group and at least a second group, each group comprises at least one of the NVDIMM-Ps, and each NVDIMM-P comprises a Non-Volatile Dual In-Line Memory Module-N (NVDIMM-N) and a Non-Volatile Dual In-Line Memory Module-F (NVDIMM-F); and
   creating a single File System Instance (FSI) for each group included in the plurality of groups,
   wherein the single FSI for the first group is stored in one NVDIMM-F in the first group, and the single FSI in the first group serves every NVDIMM-N in the first group.

2. The method of claim 1, wherein at least two of the plurality of NVDIMM-Ps are located on different channels of a memory controller interface.

3. The method of claim 1, wherein meta data for the single FSI corresponding to each group is stored in a meta partition of a NVDIMM-F included in the each group.

4. The method of claim 3, wherein the meta data in the meta partition of the NVDIMM-F is accessed using an asynchronous block interface that provides block level access to the meta partition.

5. The method of claim 3, wherein each NVDIMM-N comprises a NVDIMM-N area that stores user data, and the user data is accessed using a synchronous store interface that provides byte level access to the NVDIMM-N area.

6. The method of claim 5, wherein an entirety of the NVDIMM-N area is configured to store the user data.

7. The method of claim 5, wherein the meta data is stored only in the meta partition of the NVDIMM-F and is not stored in the NVDIMM-N area.

8. An electronic device, comprising:
a memory device comprising a plurality of Non-Volatile Dual In-Line Memory Modules-P (NVDIMM-Ps); and
a processor configured to organize the plurality of NVDIMM-Ps into a plurality of groups based on location information of the NVDIMM-Ps, and create a single File System Instance (FSI) for each group included in the plurality of groups,
wherein the plurality of groups comprises a first group and at least a second group, each group comprises at least one of the NVDIMM-Ps, and each NVDIMM-P comprises a Non-Volatile Dual In-Line Memory Module-N (NVDIMM-N) and a Non-Volatile Dual In-Line Memory Module-F (NVDIMM-F),
wherein the single FSI for the first group is stored in one NVDIMM-F in the first group, and the single FSI in the first group serves every NVDIMM-N in the first group,
wherein the single FSI for the second group is stored in one NVDIMM-F in the second group, and the single FSI in the second group serves every NVDIMM-N in the second group.

9. The electronic device of claim 8, wherein meta data for the single FSI corresponding to each group is stored in a meta partition of a NVDIMM-F included in the each group.

10. The electronic device of claim 9, wherein the meta data in the meta partition of the NVDIMM-F is accessed using an asynchronous block interface that provides block level access to the meta partition.

11. The electronic device of claim 9, wherein each NVDIMM-N comprises a NVDIMM-N area that stores user data, and the user data is accessed using a synchronous store interface that provides byte level access to the NVDIMM-N area.

12. The electronic device of claim 11, wherein an entirety of the NVDIMM-N area is configured to store the user data.

13. The electronic device of claim 11, wherein the meta data is stored only in the meta partition of the NVDIMM-F and is not stored in the NVDIMM-N area.

14. A computer program product for providing a file system for an electronic device including a memory device, the computer program product comprising a non-transitory computer-readable storage medium having program instructions embodied therewith, the program instructions executable by a processor to cause the processor to:
organize a plurality of Non-Volatile Dual In-Line Memory Module-Ps (NVDIMM-Ps) of the memory device into a plurality of groups based on location information of the NVDIMM-Ps,
wherein the plurality of groups comprises a first group and at least a second group, each group comprises at least one of the NVDIMM-Ps and each NVDIMM-P comprises a Non-Volatile Dual In-Line Memory Module-N (NVDIMM-N) and a Non-Volatile Dual In-Line Memory Module-F (NVDIMM-F); and
create a single File System Instance (FSI) for each group included in the plurality of groups,
wherein the single FSI for the first group is stored in one NVDIMM-F in the first group, and the single FSI in the first group serves every NVDIMM-N in the first group.

15. The computer program product of claim 14, wherein meta data for the single FSI corresponding to each group is stored in a meta partition of a NVDIMM-F included in the each group.

16. The computer program product of claim 15, wherein the meta data in the meta partition of the NVDIMM-F is accessed using an asynchronous block interface that provides block level access to the meta partition.

17. The computer program product of claim 15, wherein each NVDIMM-N comprises a NVDIMM-N area that stores user data, and the user data is accessed using a synchronous store interface that provides byte level access to the NVDIMM-N area.

18. The computer program product of claim 14, wherein the single FSI for the second group is stored in one NVDIMM-F in the second group, and the single FSI in the second group serves every NVDIMM-N in the second group.

19. The method of claim 1, wherein the single FSI for the second group is stored in one NVDIMM-F in the second group, and the single FSI in the second group serves every NVDIMM-N in the second group.

* * * * *